(12) United States Patent
Thoursie et al.

(10) Patent No.: US 9,253,186 B2
(45) Date of Patent: *Feb. 2, 2016

(54) METHOD AND DEVICE FOR ENSURING INFORMATION INTEGRITY AND NON-REPUDIATION OVER TIME

(71) Applicant: Brandsign AB, Sollentuna (SE)

(72) Inventors: Anders Thoursie, Nacka (SE); Peter Holm, Sollentuna (SE); Sven-Hakan Olsson, Stockholm (SE)

(73) Assignee: BRANDSIGN AB, Sollentuna (SE)

( * ) Notice: Subject to any disclaimer, the term of this patent is extended or adjusted under 35 U.S.C. 154(b) by 60 days.

This patent is subject to a terminal disclaimer.

(21) Appl. No.: 14/279,573

(22) Filed: May 16, 2014

(65) Prior Publication Data

US 2014/0250298 A1    Sep. 4, 2014

Related U.S. Application Data

(63) Continuation of application No. 11/918,902, filed as application No. PCT/SE2005/000566 on Apr. 20, 2005, now Pat. No. 8,756,413.

(51) Int. Cl.
*H04L 29/06* (2006.01)

(52) U.S. Cl.
CPC ........ *H04L 63/0823* (2013.01); *H04L 63/0442* (2013.01); *H04L 63/123* (2013.01); *H04L 63/126* (2013.01)

(58) Field of Classification Search
CPC ............................ H04L 63/0823; H04L 29/06
USPC .......................................................... 713/157
See application file for complete search history.

(56) References Cited

U.S. PATENT DOCUMENTS

| | | | |
|---|---|---|---|
| 6,212,635 B1 * | 4/2001 | Reardon ..................... 713/165 |
| 8,781,882 B1 * | 7/2014 | Arboletti et al. ............ 705/7.39 |

(Continued)

FOREIGN PATENT DOCUMENTS

| | | |
|---|---|---|
| WO | WO-99/57847 A1 | 11/1999 |
| WO | WO-01/25883 A2 | 4/2001 |

OTHER PUBLICATIONS

Durren et al, Detecting Subtle System Changes Using Digital Signatures, IEEE, 1998, pp. 125-128.*

(Continued)

*Primary Examiner* — Luu Pham
*Assistant Examiner* — Jenise Jackson
(74) *Attorney, Agent, or Firm* — Harness, Dickey & Pierce, P.L.C.

(57) ABSTRACT

The present invention relates to a method and a device for ensuring information integrity and non-repudiation over time. At least one example embodiment provides a mechanism for secure distribution of information, which information relates to an instance in time when usage of cryptographic key pairs associated with a certain brand identity commenced, as well as when the key pairs ceased to be used, i.e. when the key pairs were revoked. The mechanism further allows a company or an organization to tie administration of cryptographic key pairs and a procedure for verifying information integrity and non-repudiation to their own brand. This can be seen as a complement or an alternative to using a certificate authority (CA) as a trusted third party, which CA guarantees an alleged relation between a public key and the identity of the company or organization using the cryptographic key pair to which that public key belongs.

14 Claims, 1 Drawing Sheet

(56) References Cited

U.S. PATENT DOCUMENTS

| | | |
|---|---|---|
| 2002/0004784 A1* | 1/2002 | Forbes et al. .................. 705/51 |
| 2002/0042884 A1* | 4/2002 | Wu et al. ....................... 713/201 |
| 2002/0129241 A1 | 9/2002 | Doyle et al. |
| 2004/0210756 A1* | 10/2004 | Mowers et al. ............... 713/168 |
| 2005/0166051 A1 | 7/2005 | Buer |
| 2009/0083372 A1* | 3/2009 | Teppler ......................... 709/203 |
| 2010/0100953 A1* | 4/2010 | Mowers et al. ................ 726/10 |
| 2011/0058673 A1* | 3/2011 | Zheng et al. .................. 380/255 |
| 2012/0179911 A1* | 7/2012 | Zheng et al. .................. 713/168 |

OTHER PUBLICATIONS

Gassend et al, Caches and Hash Trees for Efficient Memory Integrity Verification, IEEE, 2002, pp. 1-12.*

Hosmer et al., "Detecting Subtle System Changes using Digital Signatures," Sep. 1998. IEEE, pp. 1-4.

Just, "Some Timestamping Protocol Failures," 1998. pp. 1-8.

Rompay et al., "The Digital Timestamping Problem," 1999. pp. 1-8.

\* cited by examiner

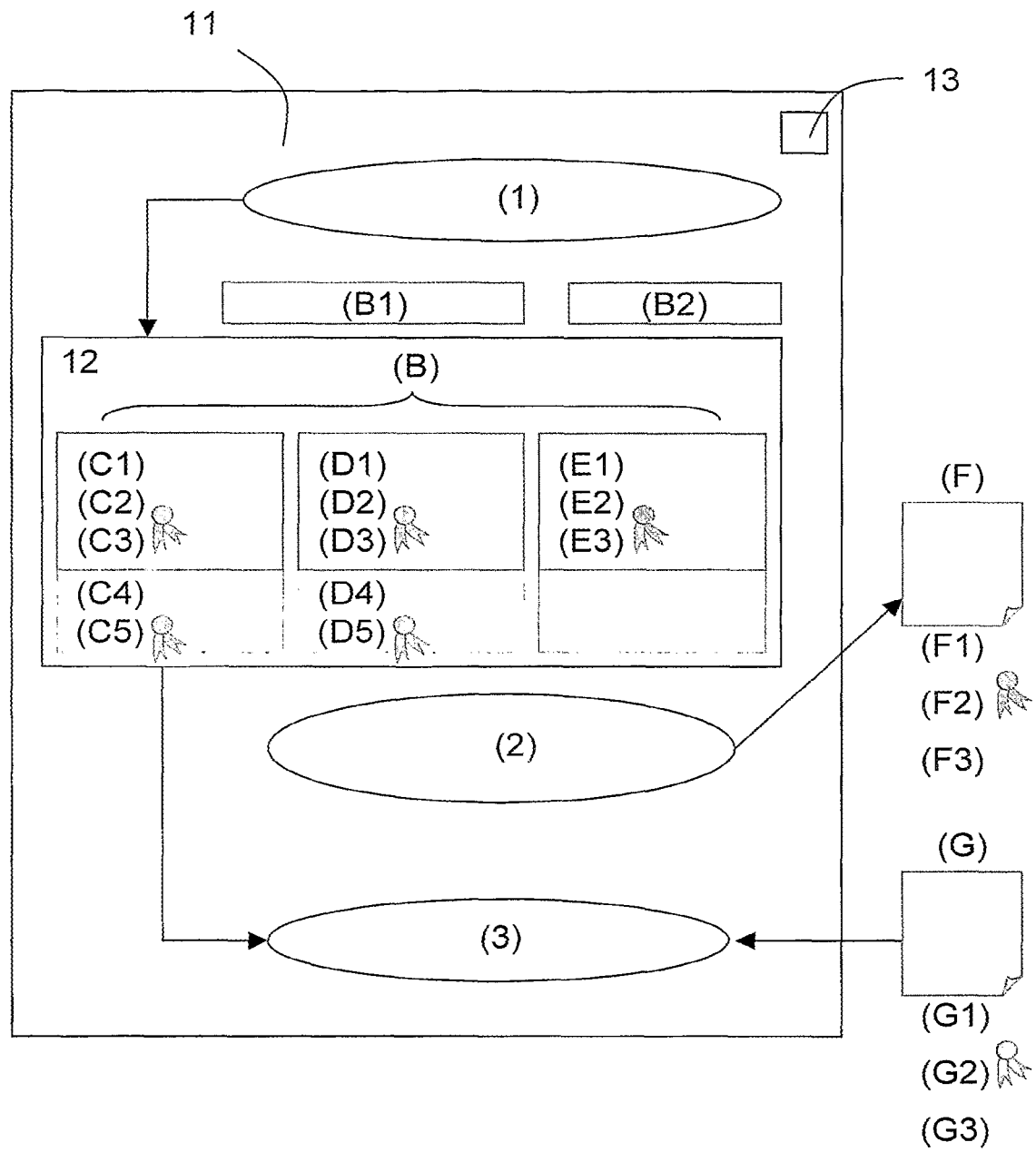

US 9,253,186 B2

METHOD AND DEVICE FOR ENSURING INFORMATION INTEGRITY AND NON-REPUDIATION OVER TIME

CROSS REFERENCE TO RELATED APPLICATIONS

This is a continuation of U.S. application Ser. No. 11/918,902, filed on Aug. 4, 2009, which is a National Phase Application of PCT/SE2005/000566, filed on Apr. 20, 2005, the entire contents of each of which are hereby incorporated by reference.

TECHNICAL FIELD OF THE INVENTION

The present invention relates to a method and a device for ensuring information integrity and non-repudiation over time.

BACKGROUND ART

Today, companies deliver great amounts of information to customers and other communication parties via the Internet. The information may comprise marketing information or subscribed information in the form of e.g. newsletters. To an ever-increasing extent, companies also choose to deliver core business information, such as invoices, account statements, insurance statements, salary statements, etc. For this type of information, there are strong requirements that it should be possible to verify at the recipient side:
  that the information has not been altered, which is often referred to as a verification of information integrity, and which party produced the information, which is often referred to as provision of non-repudiation.

Currently, there are solutions available that meet these requirements. One example is to use Public Key Infra-structure, PKI, to seal information with a certificate issued by a certificate authority.

However, this technology has shortcomings. In order to correctly verify who produced the information, it is important to have access to information concerning revocation of certificates. For certificates aimed at e.g. consumers or citizens, this type of information can be provided as a service from a certificate authority. This type of service is however not always provided for certificates used by companies and organizations. Also, information pertaining to revoked certificates is typically only provided for an initially set "lifetime" of the respective certificates, which typically is set at the time of issuing the certificates.

SUMMARY OF THE INVENTION

An object of the invention is to alleviate the problems of prior art by means of providing a straightforward and easy-to-use method to ensure information integrity and non-repudiation over time.

This object is accomplished by a method for ensuring information integrity and non-repudiation over time and a device for ensuring information integrity and non-repudiation over time in accordance with the independent claims.

According to a first aspect of the present invention, a method is provided comprising the steps of creating a key history, associating a brand identity with said key history and acquiring an administrative key pair, which is a pair of cryptographic keys containing a public key and a private key associated with said key history and brand identity and which pair is used for administering the key history, adding, if a further key pair is to be used representing the brand identity, a copy of a public key of the further key pair to said key history, calculating a hash value based on the added public key and a start time associated with the further key pair, encrypting the hash value with a private key of an administrative key pair, associating the encrypted hash value with said further key pair and adding the encrypted hash value to the key history, and adding, if a key pair representing the brand identity should cease to be used, an end time from which the key pair should cease to be used to said key history, associating said end time with the public key and calculating a hash value based on a public key of the key pair that should cease to be used and the end time, encrypting the hash value with a private key of an administrative key pair, associating the encrypted hash value with said end time and adding it to the key history.

Further, on a transmitting side, the method comprises the step of associating an information set with a time stamp, calculating a hash value based on the information set and the time stamp, encrypting the hash value with a private key of an enlisted key pair valid at the time of said time stamp, wherein an enlisted key pair valid at a certain time is a key pair of which a public key copy is added to said key history and which is associated with a start time that is earlier than said certain time and where there is no end time associated with the enlisted public key in the key history, or there is an end time associated with the enlisted public key that is later than said certain time, associating said information set, its associated time stamp, the encrypted hash value of the information set and a public key copy of the enlisted key pair of which the private key was used to encrypt the hash value.

Moreover, on a receiving side, the method comprises the steps of receiving a request for verification of an information set and an associated time stamp, public key and encrypted hash value, verifying that the encrypted hash value associated with said information set and its associated time stamp is encrypted by means of a private key comprised in the same key pair as the public key associated with the information set, verifying that the public key associated with the information set is a copy of a public key of an enlisted key pair valid at the time of the time stamp of the information set by means of the key history, verifying that the encrypted hash value in the key history, which value is associated with the start time of the public key associated with the information set is encrypted by means of a private key comprised in an administrative key pair. Finally, the method comprises the step of verifying, if there is an end time in the key history associated with said public key that is associated with the information set, that the encrypted hash value associated with the end time in the key history is encrypted by means of a private key comprised in an administrative key pair, wherein integrity and non-repudiation of the information set are verified. According to a second aspect of the present invention, devices are provided comprising means for creating a key history, associating a brand identity with said key history and acquiring an administrative key pair, which is a pair of cryptographic keys containing a public key and a private key associated with said key history and brand identity and which pair is used for administering the key history, means for adding, if a further key pair is to be used representing the brand identity, a copy of a public key of the further key pair to said key history, calculating a hash value based on the added public key and a start time associated with the further key pair, encrypting the hash value with a private key of an administrative key pair, associating the encrypted hash value with said further key pair and adding the encrypted hash value to the key history, means for adding, if a key pair representing the brand identity should cease to be used, an end time from which the key pair should cease to be used to said key history, associating said end time with the public key and calculating a hash value based on a public key of the key pair that should cease to be used and the end time, encrypting the hash value with a private key of an administrative key pair, associating the encrypted hash value with said end time and adding it to the key history and means for associating a first information set with a time stamp, calculating a hash value based on the first information set and the time stamp, encrypting the hash value with a private key of an enlisted key pair valid at the time of said time stamp, wherein an enlisted key pair valid at a certain time is a key pair of which a public key copy is added to said key history with an associated start time that is earlier than said certain time and where there is no end time associated with the enlisted public key in the key history, or there is an end time associated with the enlisted public key that is later than said certain time.

Further, a transmitting device comprises means for associating an information set, its associated time stamp, the encrypted hash value of the information set and a public key copy of the enlisted key pair of which the private key was used to encrypt the hash value.

Furthermore, a receiving device comprises means for receiving a request for verification of an information set and an associated time stamp, public key and encrypted hash value, means for verifying the that the encrypted hash value associated with said information set and its associated time stamp is encrypted by means of a private key comprised in the same key pair as the public key associated with the information set, and means for verifying that the public key associated with the information set is a copy of a public key of an enlisted key pair valid at the time of the time stamp of the second information set by means of using the key history. Moreover, the receiving device comprises means for verifying that the encrypted hash value in the key history, which value is associated with the start time of the public key associated with the information set, is encrypted by means of a private key comprised in an administrative key pair and means for verifying, if there is an end time in the key history associated with said public key associated with the information set, that the encrypted hash value associated with the end time in the key history is encrypted by means of a private key comprised in an administrative key pair, wherein integrity and non-repudiation of the second information set is verified.

A basic idea of the present invention is to provide a mechanism for secure distribution of information, which information relates to an instance in time when usage of cryptographic key pairs associated with a certain brand identity commenced, as well as when the key pairs ceased to be used, i.e. when the key pairs were revoked.

The mechanism further allows a company or an organization to tie administration of cryptographic key pairs and a procedure for verifying information integrity and non-repudiation to their own brand. This can be seen as a complement or an alternative to using a certificate authority (CA) as a trusted third party, which CA guarantees an alleged relation between a public key and the identity of the company or organization using the cryptographic key pair to which that public key belongs.

Initially, a key history is created and an administrative pair of cryptographic keys is acquired and associated with the key history. The key history is further associated with a brand identity, which is considered to guarantee the validity of the key history. The administrative key pair is used to securely add information to the key history. When a key pair is to be used, which key pair represents the brand identity, a copy of its public key is added to the key history together with information about when usage of the new key pair commences. The start time may be an existing validity start time in an acquired key pair. A hash value is created based on the added public key and the start time, the hash value is encrypted with a private key of an administrative key pair, the encrypted hash value is associated with the key pair to be used and the encrypted hash value is added to the key history. Analogously, when a key pair representing the brand identity should cease to be used, information about its end time is added to the key history and a hash value is created based on the end time and the public key of said pair to be revoked. The hash value is encrypted with a private key of an administrative key pair and added to the key history together with the end time.

It is then possible to associate an information set with a time stamp and use a key pair in the key history to calculate a hash value based on the set of information and the time stamp. This hash value is encrypted with a private key of an enlisted key pair valid at the time of the time stamp. An enlisted key pair valid at a certain time is defined as a key pair of which a copy of a public key is added to said key history with an associated start time that is earlier than the particular certain time and where there is no end time associated with the enlisted public key in the key history, or there is an end time associated with the enlisted public key that is later than the particular certain time.

Such an information set can subsequently be verified together with its time stamp, its encrypted hash value and a copy of the public key of the enlisted key pair of which the private key was used to create the encrypted hash value. This is typically performed at a request of a party to which the first information set has been submitted. The hash value is then verified in analogy with the cryptographic algorithm used to actually calculate and encrypt the hash value. Further, it is verified that the public key is enlisted in the key history and that it was used at the time of the time stamp according to the key history. Finally, the encrypted hash values associated with the start time and the end time of the public key in the key history are verified according to the algorithms used to create and encrypt the values.

It is assumed that the associations between the key history and the brand identity as well as the association between the key history and the administrative key pair are securely handled and publicly verifiable. In an embodiment of the invention, the association between the administrative key and the brand identity may be obtained by means of a certificate comprising the administrative key pair and the brand identity, which certificate is issued by a certificate authority. The certificate authority guarantees the validity of the relation between the brand identity and the administrative key pair.

In a further embodiment of the present invention, a history of brand identities is employed. When there is a need to associate a further brand identity with the key history, information regarding the time from which the further brand identity should be considered to represent the key history is added, a hash value based on the further brand identity and its time stamp is calculated and the hash value is encrypted with a private key of an administrative key pair. The encrypted hash value is thereafter associated with the further brand identity and adding the encrypted hash value to the key history. When a set of information is verified, the requester should be informed about all brand identities considered to represent the key history from the time of the time stamp associated with the set of information to be verified to the time of the request. Further, the encrypted hash values for the brand identities should be verified as a part of the overall verification of the set of information.

In yet a further embodiment of the present invention, a history of administrative key pairs, administered in analogy with the key pairs in the key history, i.e. with start and end times associated with hash values encrypted with an administrative key, based on information about the start and end times and public keys, respectively.

In still another embodiment, the succession of administrative keys is arranged in such a manner that every new key succeeds a previous key, which previous key is then ceased to be used as an administrative key. This succession is also created for the public keys in the key history.

Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

A detailed description of preferred embodiments of the present invention will be given with reference made to the accompanying drawing, in which:

FIG. 1 illustrates the method and device of the present invention.

DETAILED DESCRIPTION OF PREFERRED EMBODIMENTS OF THE INVENTION

FIG. 1 illustrates the previously mentioned mechanism for secure distribution of information, which information relates to an instance in time when usage of cryptographic key pairs associated with a certain brand identity commenced, as well as when the key pairs ceased to be used, i.e. when the key pairs were revoked. Further, it illustrates steps comprised in a method performed for administering cryptographic key pairs at e.g. a service provider 11. Information pertaining to cryptographic keys that are used is kept in a key history (B) comprised in a database stored at a storage area 12 of the service provider 11. The key history is typically managed and maintained by an administrative function (1), which e.g. handles tasks of adding information about a new, key to be used and adding information about when a key pair should cease to be used. The key history (B) has an associated administrative key pair (B1) and an associated brand identity (B2). The key history further consists of information about public keys, e.g. a first public key (C1) added to the key history, a start time (C2) associated with the first public key and an encrypted hash value (C3) which is calculated based on information (C1) and (C2) and encrypted by means of using a private key of the administrative key pair (B1). To this information, an end time (C4) is associated together with an encrypted hash value (C5) based on the information (C1) and (C4) and encrypted with the private key of the administrative key pair (B1).

FIG. 1 further illustrates a second public key, for which the corresponding information (D1)-(D5) is added to the key history (B), and corresponding information (E1)-(E3) about a third public key, for which there is no associated end time.

Activities in a second functional block (2) are those of associating a time stamp (F1) to a first set of information (F), creating an encrypted hash value (F2) based on the first information set (F) and the time stamp (F1) and associating the first information set with the time stamp, the encrypted hash value and a copy of the public key (F3) of the key pair used to encrypt the hash value (F2).

Activities in a third functional block (3) are those of receiving a request for verification of a second set of information (G) with an associated time stamp (G1), an encrypted hash value (G2) and a copy of a public key (G3) of the key pair used to encrypt the hash value (G2) and verifying the information set.

The steps defined in the method of the present invention is typically performed by a computer 13 at the service provider 11, which computer executes appropriate software for performing these steps. Hence, the functional blocks (1)-(3) are typically implemented by this computer 13 executing the appropriate software.

An example of the environment in which the present invention may be applied is given in the following.

Consider an insurance company that produces and distributes electronic insurance statements to its customers. The company makes the statements available through an Internet application, where the customers can download the statements to their own hard disk. In order to provide their customer with an objective way to verify and even subject it as proof to a third party that a statement was produced by the company and that the statement has not been altered, the company applies the method of the present invention for administering cryptographic key pairs and for performing cryptographic operations.

When implementing the method, the company first acquires a cryptographic pair of keys, i.e. an administrative key pair, in the form of a certificate issued by a certificate authority. This certificate is used to administer the cryptographic key pairs in the key history. The company then acquires a pair of cryptographic keys and adds a copy of the public key of this pair to the key history, together with a start time from which the pair is going to be used and calculates a hash value, which is then encrypted with a public key of the administrative key pair. The start time may be an existing validity start time associated with an acquired pair of cryptographic keys. New key pairs can be added to the key history in an analogous way, and existing key pairs can be revoked through adding information about when the key pair to be revoked should cease to be used, together with a hash value which is based on the key to be revoked and the end time. The hash value is further is encrypted with the public key of the administrative key pair. This may also be performed for administrative keys, as described in embodiments defined by dependent claims.

The key history and the method for verifying the authenticity of an insurance statement are made public through the Internet. When a customer subscribes to receiving insurance statements electronically, the company informs the customer about the key history and the verification procedure.

When an insurance statement is to be distributed, the company associates a time stamp with the insurance statement indicating the time when the statement is issued, and then calculates a hash value which is encrypted using a private key of a key pair enlisted in the key history. The encrypted hash value is also associated with the insurance statement together with the public key of the enlisted key pair used to encrypt the hash value. This is then distributed to the customers through sending an e-mail with a link to the statement, which can then be downloaded by the customer.

When an insurance statement is to be verified, the customer can choose to download a verification program or to use a program provided by the company at a public Internet site. Both programs are used by uploading an insurance statement and its associated information. The program accesses the key history and the insurance statement is then verified by means of:

verification of the encrypted hash value associated with the statement, according to the cryptographic algorithm used to produce the encrypted hash values, verification that the public key was used by the company by the time of the time stamp, according to the information in the key history, and verification of the information in the key history, i.e. the encrypted hash values associated with information about start and end times, according to the cryptographic algorithms used to produce the encrypted hash values.

The methods and devices of the present invention thus make it possible for the company to provide the customers with a verification procedure in an easy-to-use way, securely tied to the brand identity of the company, giving the customers a proof that the information content of an insurance statement originates from the company. The verification procedure takes into account if and when a cryptographic key pair is/was revoked. The methods and devices of the present invention further render it possible to verify both contemporary and historical information, independent of when the key pair used to calculate the hash sum was revoked.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method for ensuring information integrity and non-repudiation over time, said method comprising:

creating, by a computing device, a key history, associating a brand identity with said key history and acquiring an administrative key pair, which is a pair of cryptographic keys containing a public key and a private key associated with said key history and brand identity and which pair is used for administering the key history;

adding, if a further key pair is to be used representing the brand identity associated with the key history, a copy of a public key of the further key pair to said key history, calculating a hash value based on the added public key and a start time associated with said further key pair, encrypting the hash value with a private key of an administrative key pair, associating the encrypted hash value with said further key pair and adding the encrypted hash value to the key history;

adding, if a key pair representing the brand identity ceases to be used, an end time from which the key pair ceases to be used to said key history, associating it with a public key of the key pair that ceases to be used and calculating a hash value based on the public key of the key pair that ceases to be used and the end time, encrypting the hash value with a private key of an administrative key pair, associating the encrypted hash value with said end time and adding it to the key history;

associating an information set with a time stamp, calculating a hash value based on the information set and the time stamp, encrypting the hash value with a private key of an enlisted key pair valid at the time of said time stamp, wherein an enlisted key pair valid at a certain time is a key pair, of which a public key copy is added to said key history and which is associated with a start time that is earlier than said certain time, and where there is no end time associated with the enlisted public key in the key history, or there is an end time associated with the enlisted public key that is later than said certain time, wherein verification of integrity and non-repudiation is to be enabled for information in the information set; and associating said information set, its associated time stamp, the encrypted hash value of the information set and a public key copy of the enlisted key pair from which the private key was used to encrypt the hash value.

2. The method according to claim 1, wherein the association between the administrative key pair acquired when creating the key history and the brand identity, to which the key history is associated when it is created, is obtained by a certificate comprising the administrative key pair and said brand identity, which certificate is issued by a certificate authority, and wherein a verification operation of a request includes verifying authenticity of the certificate in which said administrative key pair is comprised.

3. The method according to claim 1, further comprising:

adding, if a further brand identity is to be associated with the key history, the further brand identity to the key history and an associated time stamp from which the further brand identity is associated with the key history, calculating a hash value based on the further brand identity and the associated time stamp, encrypting the hash value with a private key of an administrative key pair, associating the encrypted hash value with said further brand identity and adding the encrypted hash value to the key history; and informing, in a verification operation of a request, a requesting party of the brand identities added to the key history during a time period from the time stamp associated with the information set to the time when the request was received.

4. The method according to claim 1, further comprising:

making the key history and a procedure of a verification operation public.

5. The method according to claim 1, further comprising:

associating a start time to the administrative key pair acquired and associated with the key history when the key history is created, which start time indicates the time from which the administrative key pair is going to be used to administer the key history;

adding, if a further administrative key pair is to be used to administer the key history, a copy of a public key of the further administrative key pair to said key history together with an associated start time from which said further administrative key pair will be used to administer the key history, calculating a hash value based on the added administrative public key and the start time, encrypting the hash value with a private key of a valid administrative key pair, associating the encrypted hash value with said further administrative key pair and adding the encrypted hash value to the key history, wherein a valid administrative key pair valid at a certain time is an administrative key pair for which there is an associated start time which is later than the start time of said further administrative key pair and for which there is no associated end time or there is an associated end time which is later than the start time of said further administrative key pair;

adding, if an administrative key pair ceases to be used to administer the key history, an end time from which the administrative key pair ceases to be used to said key history, associating the end time with the public key copy of the administrative key pair and calculating a hash value based on a public key of the administrative key pair that ceases to be used and the end time, encrypting the hash value with a private key of a valid administrative key pair, associating the encrypted hash value with said end time and adding it to the key history; and verifying, for each encrypted hash value that is comprised in the key history and verified when receiving a request, the administrative key pair used to encrypt said each hash value, wherein verifying the administrative key pair comprises, verifying that said each encrypted hash value is associated with a start time or an end time of a public key added to the key history or that it is associated with an administrative key pair;

verifying that the administrative key pair to be verified was a valid administrative key pair at said start time or end time;

verifying, for the start time and end time associated with the administrative key pair, that the encrypted hash value associated with each of said start time and end time is encrypted with a private key of an administrative key pair valid at the time of said start time or end time; and verifying, for the encrypted hash value of each said start time and end time, the administrative key pair employed to encrypt the hash value.

6. The method according to claim 5, wherein the end time of an administrative key pair is equal to the start time of an immediately subsequent administrative key pair associated with the key history.

7. A device for ensuring information integrity and non-repudiation over time, said device comprising:

a memory; and at least one computer processor configured to, create a key history, associating a brand identity with said key history and acquiring an administrative key pair, which is a pair of cryptographic keys containing a public key and a private key associated with said key history and brand identity and which pair is used for administering the key history, add, if a further key pair representing the brand identity is to be used representing the brand identity associated with the key history, a copy of a public key of the further key pair to said key history, calculating a hash value based on the added public key and a start time associated with said further key pair, encrypting the hash value with a private key of an administrative key pair, associating the encrypted hash value with said further key pair and adding the encrypted hash value to the key history, add, if a key pair representing the brand identity ceases to be used, an end time from which the key pair ceases to be used to said key history, associating it with the public key of the key pair that ceases to be used and calculating a hash value based on a public key of the key pair that ceases to be used and the end time, encrypting the hash value with a private key of an administrative key pair, associating the encrypted hash value with said end time and adding it to the key history, associate an information set with a time stamp, calculating a hash value based on the information set and the time stamp, encrypting the hash value with a private key of an enlisted key pair valid at the time of said time stamp, wherein an enlisted key pair valid at a certain time is a key pair, of which a public key copy is added to said key history and which is associated with a start time that is earlier than said certain time, and where there is no end time associated with the enlisted public key in the key history, or there is an end time associated with the enlisted public key that is later than said certain time, wherein verification of integrity and non-repudiation are to be enabled for information in the information set, and associate said information set, its associated time stamp, the encrypted hash value of the information set and a public key copy of the enlisted key pair from which the private key was used to encrypt the hash value.

8. The device according to claim 7, wherein the association between the administrative key pair acquired when creating the key history and the brand identity, to which the key history is associated when it is created, is obtained by a certificate comprising the administrative key pair and said brand identity, which certificate is issued by a certificate authority, and wherein the at least one computer processor is configured to verify authenticity of the certificate in which said administrative key pair is comprised.

9. The device according to claim 7, wherein the at least one computer processor is configured to, add, if a further brand identity is to be associated with the key history, the further brand identity to the key history and an associated time stamp from which the further brand identity is associated with the key history, calculating a hash value based on the further brand identity and the associated time stamp, encrypting the hash value with a private key of an administrative key pair, associating the encrypted hash value with said further brand identity and adding the encrypted hash value to the key history, and inform, in a verification operation of a request, a requesting party of the brand identities added to the key history during a time period from the time stamp associated with the information set to a time of the request.

10. The device according to claim 7, wherein the at least one computer processor is configured to make the key history and a procedure of a verification operation public.

11. The device according to claim 7, wherein the at least one computer processor is configured to, associate a start time to the administrative key pair acquired and associated with the key history when the key history is created, which start time indicates the time from which the administrative key pair is going to be used to administer the key history, add, if a further administrative key pair is to be used to administer the key history, a copy of a public key of the further administrative key pair to said key history together with an associated start time from which said further administrative key pair will be used to administer the key history, calculating a hash value based on the added administrative public key and the start time, encrypting the hash value with a private key of a valid administrative key pair, associating the encrypted hash value with said further administrative key pair and adding the encrypted hash value to the key history, wherein a valid administrative key pair valid at a certain time is an administrative key pair for which there is an associated start time which is later than the start time of said further administrative key pair and for which there is no associated end time or there is an associated end time which is later than the start time of said further administrative key pair, add, if an administrative key pair ceases to be used to administer the key history, an end time from which the administrative key pair ceases to be used to said key history, associating the end time with the public key copy of the administrative key pair and calculating a hash value based on a public key of the administrative key pair that ceases to be used and the end time, encrypting the hash value with a private key of a valid administrative key pair, associating the encrypted hash value with said end time and adding it to the key history, verify, for each encrypted hash value that is comprised in the key history and verified when receiving a request, the administrative key pair used to encrypt said each hash value, wherein at least one computer processor is configured to verify that said each encrypted hash value is associated with a start time or an end time of a public key added to the key history or that it is associated with an administrative key pair, verify that the administrative key pair to be verified was a valid administrative key pair at said start time or end time, verify, for the start time and end time associated with the administrative key pair, that the encrypted hash value associated with each of said start time and end time was encrypted with a private key of an administrative key pair valid at the time of said start time or end time, and verify, for the encrypted hash value of each said start time and end time, the administrative key pair employed to encrypt the hash value.

12. The device according to claim 11, wherein the end time of an administrative key pair is set to be equal to the start time of an immediately subsequent administrative key pair associated with the key history.

13. A method for ensuring information integrity and non-repudiation over time, said method comprising:

creating, by a computing device, a key history, associating a brand identity with said key history and acquiring an administrative key pair, which is a pair of cryptographic keys containing a public key and a private key associated with said key history and brand identity and which pair is used for administering the key history;

adding, if a further key pair is to be used representing the brand identity associated with the key history, a copy of a public key of the further key pair to said key history, calculating a hash value based on the added public key and a start time, with which said further key pair is associated, encrypting the hash value with a private key of an administrative key pair, associating the encrypted hash value with said further key pair and adding the encrypted hash value to the key history;

adding, if a key pair representing the brand identity ceases to be used, an end time from which the key pair ceases to be used to said key history, associating it with a public key of the key pair that ceases to be used and calculating a hash value based on the public key of the key pair that ceases to be used and the end time, encrypting the hash value with a private key of an administrative key pair, associating the encrypted hash value with said end time and adding it to the key history;

receiving a request for verification of an information set, and receiving an associated time stamp, public key and encrypted hash value, the information set including information for which integrity and non-repudiation verification is enabled;

verifying that the encrypted hash value associated with said information set and its associated time stamp is encrypted by a private key comprised in the same key pair as the public key associated with the information set;

verifying, using the key history, that the public key associated with the information set is a copy of a public key of an enlisted key pair valid at the time of the time stamp of the information set;

verifying that the encrypted hash value in the key history, which hash value is associated with the start time of the public key associated with the information set is encrypted by a private key comprised in an administrative key pair; and verifying, if there is an end time associated with said public key associated with the information set in said key history, that the encrypted hash value associated with the end time in the key history is encrypted by a private key comprised in an administrative key pair, whereby integrity and non-repudiation of the information set are verified.

14. A device for ensuring information integrity and non-repudiation over time, said device comprising:

a memory; and at least one computer processor configured to, create a key history, associating a brand identity with said key history and acquiring an administrative key pair, which is a pair of cryptographic keys containing a public key and a private key associated with said key history and brand identity and which pair is used for administering the key history, add, if a further key pair representing the brand identity is to be used representing the brand identity associated with the key history, a copy of a public key of the further key pair to said key history, calculating a hash value based on the added public key and a start time associated with said further key pair, encrypting the hash value with a private key of an administrative key pair, associating the encrypted hash value with said further key pair and adding the encrypted hash value to the key history, add, if a key pair representing the brand identity ceases to be used, an end time from which the key pair ceases to be used to said key history, associating it with the public key of the key pair that ceases to be used and calculating a hash value based on a public key of the key pair that ceases to be used and the end time, encrypting the hash value with a private key of an administrative key pair, associating the encrypted hash value with said end time and adding it to the key history, receive a request for verification of an information set, and receive an associated time stamp, public key and encrypted hash value, the information set including information for which integrity and non-repudiation verification is enabled, verify that the encrypted hash value associated with said information set and its associated time stamp is encrypted by a private key comprised in the same key pair as the public key associated with the information set, verify that the public key associated with the information set is a copy of a public key of an enlisted key pair valid at the time of the time stamp of the information set by using the key history, verify that the encrypted hash value in the key history, associated with the start time of the public key associated with the information set is encrypted by a private key comprised in an administrative key pair, and verify, if there is an end time associated with said public key associated with the information set in said key history, that the encrypted hash value associated with the end time in the key history is encrypted by a private key comprised in an administrative key pair, whereby integrity and non-repudiation of the information set are verified.

* * * * *